United States Patent
Garcia et al.

(10) Patent No.: US 10,645,023 B2
(45) Date of Patent: *May 5, 2020

(54) SERVER-INITIATED BANDWIDTH CONSERVATION POLICIES

(71) Applicant: Facebook, Inc., Menlo Park, CA (US)

(72) Inventors: David Harry Garcia, Sunnyvale, CA (US); Justin Mitchell, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/412,704

(22) Filed: Jan. 23, 2017

(65) Prior Publication Data

US 2017/0134303 A1    May 11, 2017

Related U.S. Application Data

(63) Continuation of application No. 14/328,726, filed on Jul. 11, 2014, now Pat. No. 9,591,517, which is a continuation of application No. 13/210,953, filed on Aug. 16, 2011, now Pat. No. 8,812,661.

(51) Int. Cl.
| | |
|---|---|
| *H04L 12/911* | (2013.01) |
| *H04L 12/26* | (2006.01) |
| *H04L 12/24* | (2006.01) |
| *H04L 12/913* | (2013.01) |

(Continued)

(52) U.S. Cl.
CPC .......... *H04L 47/748* (2013.01); *H04L 41/065* (2013.01); *H04L 41/069* (2013.01); *H04L 41/12* (2013.01); *H04L 43/0811* (2013.01); *H04L 43/0882* (2013.01); *H04L 47/724* (2013.01); *H04W 28/0284* (2013.01); *H04W 28/0289* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 6,216,104 B1 * | 4/2001 | Moshfeghi | G06F 19/325 704/260 |
| 7,734,589 B1 * | 6/2010 | Svendsen | G06F 17/30017 707/636 |

(Continued)

*Primary Examiner* — Thomas J Dailey
(74) *Attorney, Agent, or Firm* — Baker Botts L.L.P.

(57) ABSTRACT

In one embodiment, a social networking system maintains a moving average of the number of connection problems, including socket timeouts and failed uploads, per client in a geographic area to determine whether the wireless data network serving the geographic area is overloaded. In response to detecting a network overload, the social networking system may transmit an instruction to the clients in the particular geographic area to enter one of a plurality of traffic throttling modes. In particular embodiments, the social networking system maintains a historical log of network overload conditions, and uses the historical log to generate an estimate of the wireless network capacity serving a geographic area. Thus, the social networking system may preemptively transmit instructions to clients to enter a bandwidth-conservation mode when the estimated traffic demand exceeds the estimated capacity for a particular geographic region.

20 Claims, 6 Drawing Sheets

(51) Int. Cl.
*H04W 28/02* (2009.01)
*H04W 64/00* (2009.01)

(56) References Cited

U.S. PATENT DOCUMENTS

| | | | |
|---|---|---|---|
| 8,214,862 B1* | 7/2012 | Lee | H04N 21/21805 370/332 |
| 2002/0093956 A1* | 7/2002 | Gurin | H04L 12/5692 370/389 |
| 2004/0199635 A1* | 10/2004 | Ta | H04L 41/0893 709/226 |
| 2004/0264501 A1* | 12/2004 | Zalitzky | H04B 3/544 370/468 |
| 2006/0242103 A1* | 10/2006 | Chavda | G06F 11/3419 |
| 2008/0134053 A1* | 6/2008 | Fischer | G06Q 10/02 715/747 |
| 2009/0100109 A1* | 4/2009 | Turski | G06F 17/30165 |
| 2011/0055342 A1* | 3/2011 | Hockey | G06F 17/30861 709/206 |
| 2011/0066752 A1* | 3/2011 | Lippincott | H04L 43/0894 709/233 |
| 2011/0119745 A1* | 5/2011 | Bremner | H04L 63/0853 726/7 |
| 2012/0120818 A1* | 5/2012 | Lientz | H04L 41/0896 370/252 |
| 2013/0041948 A1* | 2/2013 | Tseng | H04L 67/06 709/204 |
| 2013/0142038 A1* | 6/2013 | Pan | H04L 47/25 370/230 |

* cited by examiner

SERVER-INITIATED BANDWIDTH CONSERVATION POLICIES

RELATED APPLICATION(S)

This application is a continuation under 35 U.S.C. § 120 of U.S. patent application Ser. No. 14/328,726, filed 11 Jul. 2014, which is a continuation under 35 U.S.C. § 120 of U.S. patent application Ser. No. 13/210,953, filed 16 Aug. 2011, now U.S. Pat. No. 8,812,661 which is incorporated herein by reference.

TECHNICAL FIELD

The present disclosure relates generally to social networking and mobile devices and, in particular embodiments, to detecting, via a server device, whether clients in a particular geographic region are overloading the wireless cellular data network serving the region, and issuing an instruction to the clients in the particular region to throttle their upstream traffic to the social networking system.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system. The social networking system may generate a webpage, or a newsfeed, for a particular user, comprising the recent activities of the user's first-degree connections on the social network. Users utilizing mobile devices having data connections to the social networking system may upload photos or perform actions remotely that appear on his or her news feed when the content is completely uploaded to the social networking system.

SUMMARY

Particular embodiments relate to a social networking system that includes features directed detecting via one or more servers of the social networking system whether clients in a particular geographic region are or will overload the wireless cellular data network servicing the geographic region, and transmitting an instruction to the clients in the geographic region to throttle their own upstream traffic to the social networking system. In particular embodiments, throttling traffic may comprise queuing content for transmission to the social networking system on the client-side device. These and other features, aspects, and advantages of the disclosure are described in more detail below in the detailed description and in conjunction with the following figures.

DETAILED DESCRIPTION

Figure 1:
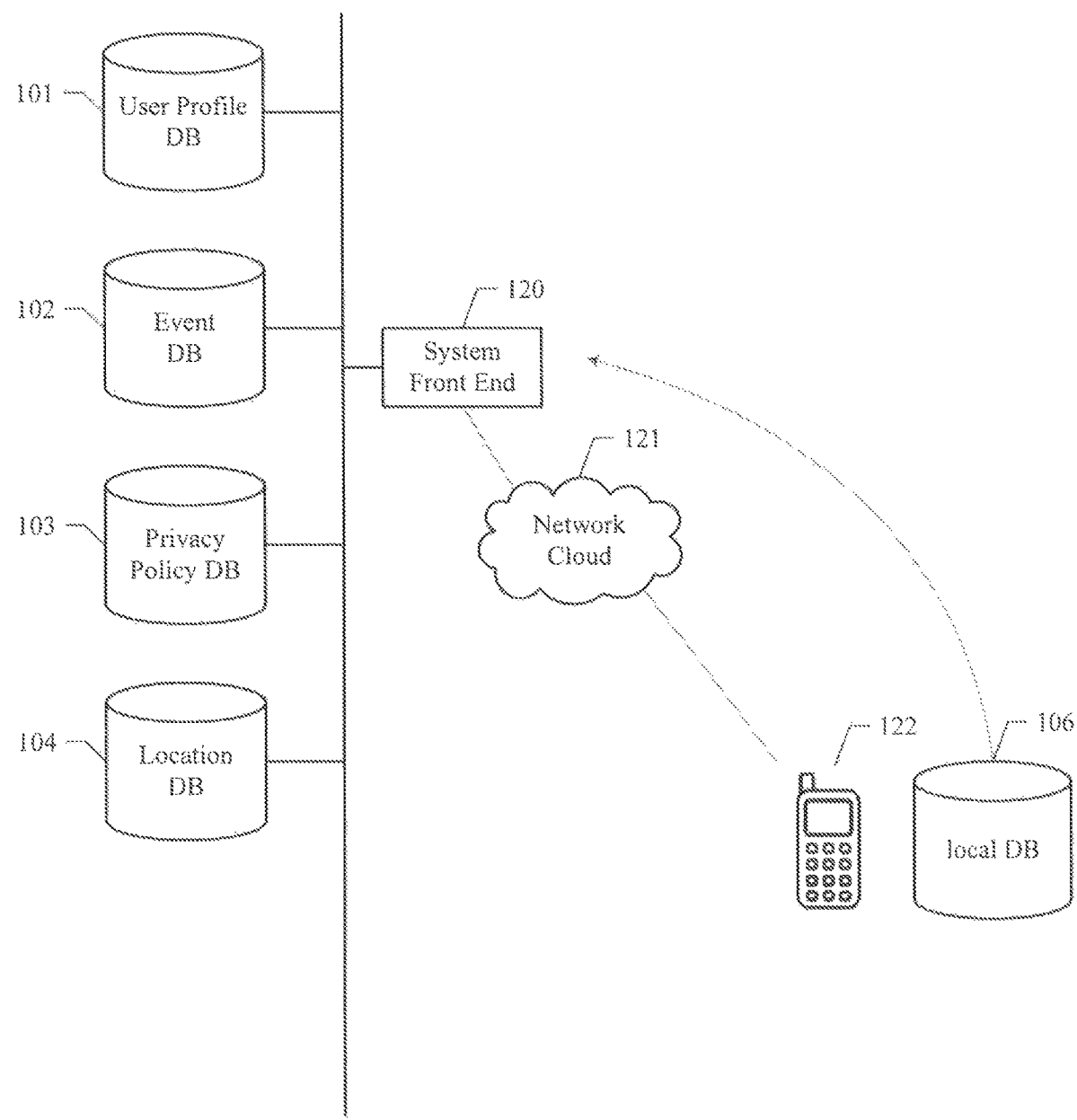
FIG. 1 illustrates an example social networking system.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item index-able and searchable on the Internet). A user may choose a default privacy setting for all user data that is to be posted. Additionally, a user may specifically exclude certain entities from viewing a user datum or a particular type of user data.

Social networking system may maintain a database of information relating to geographic locations or places. Places may correspond to various physical locations, such as restaurants, bars, train stations, airports and the like. Some places may correspond to larger regions that themselves contain places—such as a restaurant or a gate location in an airport. In one implementation, each place can be maintained as a hub node in a social graph or other data structure maintained by the social networking system, as described in U.S. patent application Ser. No. 12/763,171, which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The user may also provide comments in a text string when checking in to a given place. The user may also identify one or more other users in connection with a check-in (such as friends of a user) and associate them with the check-in as well. U.S. patent application Ser. No. 12/574,614, which is incorporated by reference herein for all purposes, describes a system that allows a first user to check-in other users at a given place. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. For example, social networking system may select the check-in activity associated with the friends or other social contacts of a user that requests a page corresponding to a place. U.S. application Ser. No. 12/858,718, incorporated by reference in its entirety for all purposes, describes an example geo-social networking system that can be used in connection with various embodiments of the present invention. The check-in activity may also be displayed on a user profile page and in news feeds provided to users of the social networking system.

In particular embodiments, the social networking system may provide a single webpage that displays the recent activity of the user's first-degree connections' actions on the social network. This type of view, also called a "news feed," allows a user of the social network to quickly view and access pertinent and temporally relevant information about his friends, interests, and pages the user has expressed an affinity to. The news feed, in particular embodiments, also includes story entries from the user's own actions on, and uploads to, the social networking system (such as status updates, wall posts, photo uploads, check-ins to a geo-social networking system). In particular embodiments, the stories in the news feed are organized chronologically. In particular embodiments, the stories in the news feed are organized based on a social relevancy score calculated by the social networking system.

In addition to geo-social functionality, the mobile device as described above may permit a user to remotely upload content, and perform other actions on the social network over a mobile data network. In particular embodiments, the user may, through his or her mobile device, upload photographs to the social networking system. However, where large numbers of users are in the same geographic region, a high degree of upstream traffic from those users to the social networking system may overload the wireless data network or networks servicing the geographic region, resulting in socket timeouts, failed uploads, and other connection issues that reduce system responsiveness. In particular embodiments, the social networking system may identify geographic areas where the wireless data connection is overloaded, and transmit an instruction to the clients in the geographic area to throttle their upstream communications with the social networking service to prevent further overloading the wireless data network.

In particular embodiments, the throttling system generates a real-time newsfeed from assets local to the client to give the user the impression of responsiveness. U.S. patent application Ser. No. [reference 0308 application, "client side news feed view"], which is incorporated by reference herein for all purposes, describes a system that renders a local newsfeed from client-side assets and permits an uploading user to interact with the uploaded content even prior to its upload to the social networking system.

In particular embodiments, content updates from throttled users is placed into a priority queue, with smaller sized content having higher priority. In particular embodiments, content is scored via social factors, so that content that is the most socially interesting or relevant is assigned a higher priority. In particular embodiments, the throttling instructions have various modes of throttling.

Still further, the social networking system may log certain geographic regions and times where overloading of the wireless data network is likely to occur. For example, based off a log of historical overloading of the wireless data network in particular geographic regions, the social networking system can form an estimate of the wireless data capacity of the geographic region. In particular embodiments, the social networking system may then preemptively instruct clients in the geographic area to throttle their upstream communications before a network overload occurs. In particular embodiments, the social networking system may augment its database of wireless network capacity with external database, such as event databases or sporting event schedules.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. In particular embodiments, the social networking system may store user privacy policy data in privacy policy database 103. In particular embodiments, the social networking system may store geographic and location data in location database 104. In particular embodiments, databases 101, 102, 103, and 104 may be operably connected to the social networking system's front end. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Front end 120 may also include a newsfeed generator that generates news feeds in response to user requests. In particular embodiments, news feed generator resides on one or more servers separate from front end 120. Network cloud 121 generally represents a network or collection of networks (such as the Internet or a corporate intranet, or a combination of both) over which client devices 122 may access the social network system.

In particular embodiments, location database 104 may store an information base of places, where each place includes a name, a geographic location and meta information (such as the user that initially created the place, reviews, comments, check-in activity data, and the like). Places may be created by administrators of the system and/or created by users of the system. For example, a user may register a new place by accessing a client application to define a place name and provide a geographic location and cause the newly created place to be registered in location database 104. As discussed above, a created place may correspond to a hub node, which an administrator can claim for purposes of augmenting the information about the place and for creating ads or other offers to be delivered to users. In particular embodiments, system front end 120 may construct and serve a web page of a place, as requested by a user. In some embodiments, a web page of a place may include selectable components for a user to "like" the place, check in to the place, upload photos related to the place (in connection with a check-in or at a later time). In particular embodiments, location database 104 may store geo-location data identifying a real-world geographic location of a user associated with a check-in. For example, a geographic location of an Internet connected computer can be identified by the computer's IP address. For example, a geographic location of a cell phone equipped with cellular, Wi-Fi and/or GPS capabilities can be identified by cell tower triangulation, Wi-Fi positioning, and/or GPS positioning. In particular embodiments, location database 104 may store a geographic location and additional information of a plurality of places.

In particular embodiments, users may utilize client device 122 to upload content or perform actions on the social network, such as status updates, wall posts, check-ins, and the like. In particular embodiments, the client device itself may decide to queue one or more of the activities for upload at a later time in order to, for example, conserve battery life. However, in particular cases where a large number of clients serviced by the same carrier cellular tower are simultaneously attempting content uploads to the social network, the carrier's wireless cellular network may become overloaded. For example, in Universal Mobile Telecommunications Systems (UMTS) a particular Node B may only support a limited number, such as 1000, PDP contexts (IP addresses). Because each application requiring an IP address on a mobile device requires its own PDP context, in a crowded environment, such as a baseball game or public event, a single Node B may become overloaded fairly quickly. As a result, users' socket connections to the social networking system may time out, thereby causing their uploads or downloads of data to fail, and undermine the overall responsiveness and user experience.

Figure 2:
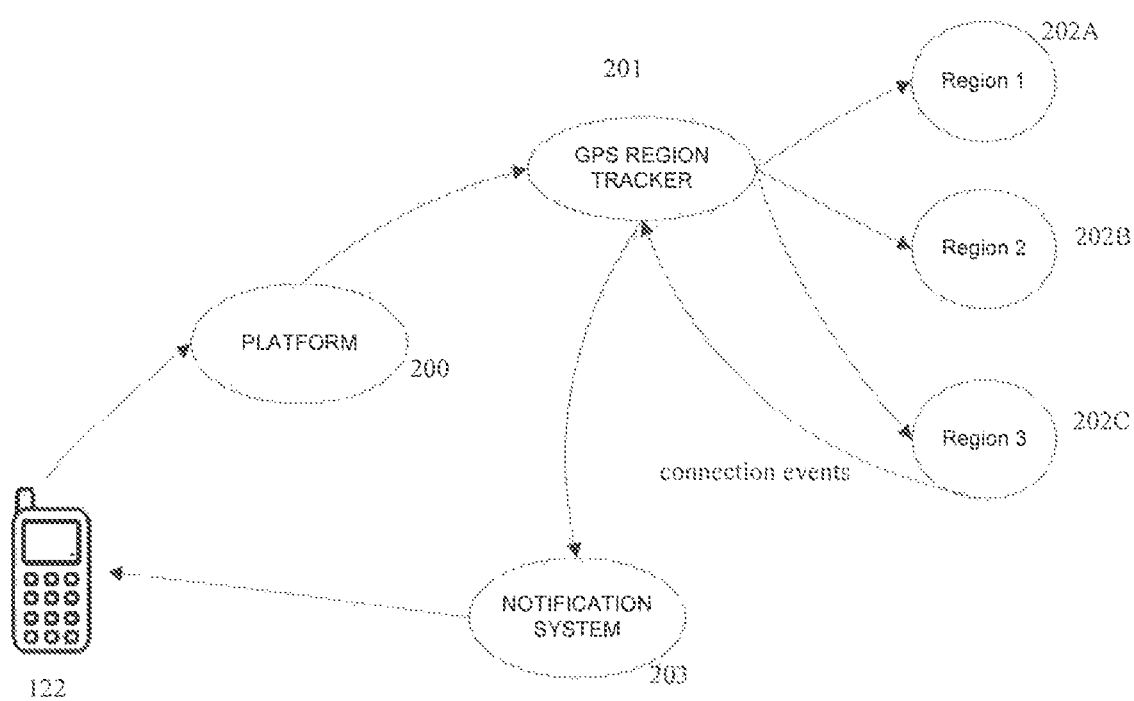
FIG. 2 illustrates an example server architecture for detecting an overloaded wireless network.

FIG. 2 illustrates an example system architecture for ameliorating this overloaded network issue. Mobile devices 122 communicate with social networking platform 200. In particular embodiments, system front end 120 from FIG. 1 may include both social networking platform 200 as well as notification system 203. In particular embodiments, notification system 203 only handles downstream communications from the social networking system to mobile devices 122. In particular embodiments, notification system 203 utilizes push notifications. In particular embodiments, notification system 203 utilizes short message service (SMS) channels to transmit push notifications to mobile devices 122. In particular embodiments, notification system 203 utilizes TCP/IP or VPN tunnels to push notifications to mobile devices 122. In particular embodiments, notification system 203 is hosted by a third party, such as a Google Android push server or a Java push server, that integrates via an application programming interface (API) to a social networking software client that resides on mobile device 122. This disclosure contemplates any suitable manner of implementing notification system 203.

Platform 200 communicates location information from mobile device 122 to GPS region tracker 201. In particular embodiments, mobile device 122 periodically transmits location data to platform 200. In particular embodiments, mobile device 122 transmits its location to platform 200 every time it initiates a communication with platform 200. In particular embodiments, mobile device 122 calculates its location from a built-in GPS receiver. In particular embodiments, mobile device 122 calculates its location through time-distance of arrival (TDoA) or other triangulation techniques. In particular embodiments, users of mobile device 122 transmit explicit location identifiers to platform 200 in the form of check-ins, comments, status messages, reviews, and the like. In such embodiments, platform 200 may access location database 104 to obtain the exact geographic coordinates of the location specified by a user check-in. In particular embodiments, platform 200 utilizes audio waveform matching to ascertain that a particular user is near another user having a known location. In particular embodiments, the location of mobile device 122 may be ascertained from the EXIF data in an uploaded image. This disclosure contemplates any suitable manner of determining the geographic region of a mobile device 122.

Upon obtaining the location of a particular mobile device 122, GPS region tracker 201 may place mobile device 122 into a particular region, such as regions 202A-202C. In particular embodiments, each region corresponds to a single cell tower (Node B, base transceiver station (BTS), or the like) for a single carrier. In particular embodiments, each region 202A-202C corresponds to multiple cellular towers in a particular area. In particular embodiments, GPS region tracker 201 comprises a plurality of distributed servers. In embodiments where each region 202A-202C is carrier specific, platform 200 may also obtain the carrier from mobile device 122. In particular embodiments, the carrier providing service to mobile device 122 may be discovered using a reverse IP address lookup. In particular embodiments, the carrier is discovered through the SIM, NSAPI, IMEI, or IMSI of mobile device 122. This disclosure contemplates any suitable method of determining the carrier of a particular mobile device 122.

In particular embodiments, GPS region tracker 201 maintains a historical log of users (through their mobile devices 122) movements, their wireless data carrier, and connection events as they move from region to region. In particular embodiments, wireless connection events comprise: a socket timeout, a server timeout, a failed upload, a failed download, and the like. In particular embodiments, GPS region tracker 201 also records the round trip "ping" time for each user. This disclosure contemplates logging any suitable set of connection events to estimate wireless data network capacity. Thus, as will be further described with reference to FIG. 3, GPS region tracker 201 knows, at any given time, whether a particular geographic region is overloaded due to excessive connections to the social networking system.

Figure 4:
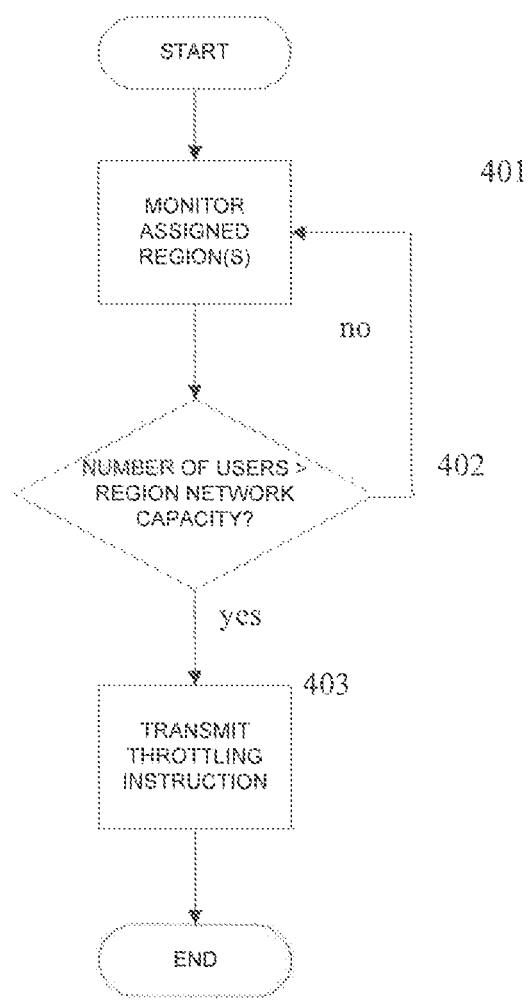
FIG. 4 illustrates an example method of preemptively issuing a throttling instruction in accordance with one embodiment of the invention.

Furthermore, as will be further described with respect to FIG. 4, GPS region tracker 201 may estimate the overall cellular tower data capacity for a given geographic region. In particular embodiments, GPS region tracker 201 may estimate the overall cellular tower capacity for a given geographic region for a specific carrier. Combined with the historical log of all the cell tower overloading events, GPS region tracker 201 may estimate the overall cellular tower capacity for a given geographic region, carrier, and time. In particular embodiments, GPS region tracker 201 may correlate the times of insufficient capacity to an event database to enhance its predictive ability regarding cellular data link capacity. For example, if GPS region tracker 201 detects insufficient data network events at an AT&T Node B serving AT&T park every time there is a San Francisco Giants game, GPS region tracker 201 may automatically institute a bandwidth throttling mode for any mobile device 122 served by that Node B from the hour prior to, to the hour after, any SF Giants games.

In particular embodiments, GPS region tracker 201 issues the throttling command directly to notification system 203, which in turn pushes the instruction via a push notification to mobile device 122. In particular embodiments, GPS region tracker merely identifies mobile devices that are in "problem regions" to platform 200, and platform issues the throttling command to mobile device 122. In particular embodiments, Platform 200 issues the throttling instruction via notification system 203. This disclosure contemplates any suitable manner of generating and delivering a throttling instruction to mobile device 122.

Figure 3:
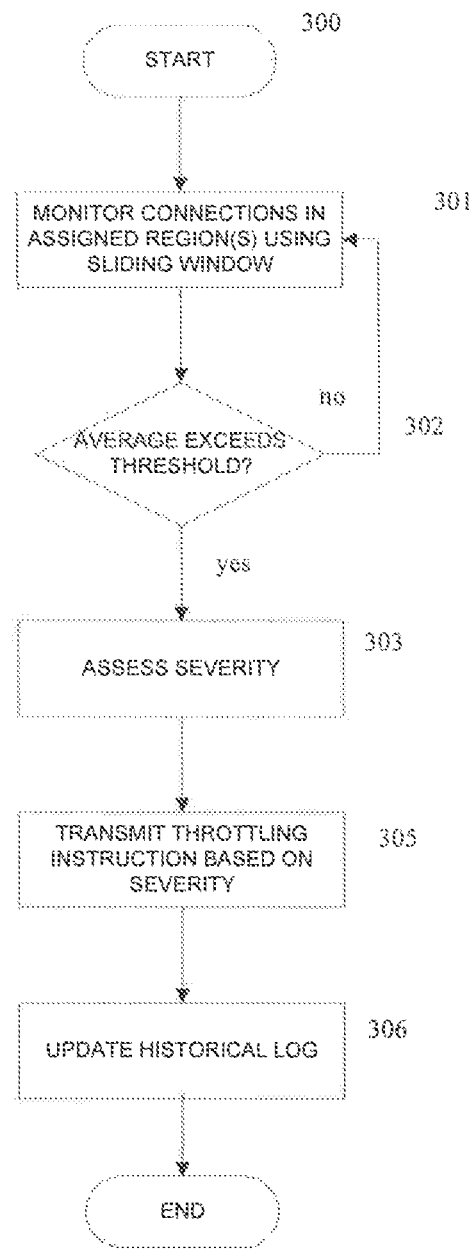
FIG. 3 illustrates an example method for detecting an overloaded wireless network in accordance with one embodiment of the invention.

FIG. 3 illustrates an example method for detecting overloaded cellular data networks. At Step 301, GPS region tracker 201 monitors all the connections for mobile devices 122 in its assigned region or regions. As previously disclosed, GPS region tracker 201 may be responsible for monitoring a particular geographic region comprising a single cell site from a single carrier on the granular end, or at the other extreme, a geographic area covering multiple cellular sites for a plurality of carriers. While this disclosure primarily discloses, as an example, monitoring cellular wireless data network towers, this disclosure also contemplates other types of wireless networks as geographic regions, for example, all the users connected to a particular WiMAX network. In particular embodiments, GPS region trackers 201 may even monitor the congestion level of standard WiFi networks. This disclosure contemplates any suitable number of GPS region trackers 201 of any suitable granularity.

At Step 301, GPS region tracker 201 monitors the average number of connection problems experienced by clients in one or more regions. For example, if a particular GPS region tracker 201 is responsible for monitoring all AT&T and Verizon connections for two particular cellular towers, GPS region tracker monitors mobile devices 122 being serviced by the two cell towers in two "buckets", one for Verizon, and one for AT&T. In particular embodiments, GPS region trackers 201 maintain a moving average of the number of connection problems per user for the "bucket" in question. In particular embodiments, GPS region trackers 201 use a sliding window of a predetermined amount of time, for example, the number of connection problems per user in each "bucket" in a 20 minute window. Thus, a particular GPS region tracker 201 may maintain multiple moving averages for each region, cell tower, or the like that it is responsible for monitoring.

If the moving average for any one monitored region exceeds a predetermined threshold, such as 10% of all connections experiencing errors, GPS region tracker 201 at Step 303 assesses the severity of the connection problem. In particular embodiments, GPS region tracker 201 assesses the severity of congestion via one or more thresholds of the moving average. For example, if the moving average exceeds 20% of all users in region experiencing connection problems, GPS region tracker 201 may determine that the congestion is "severe." In particular embodiments, GPS region tracker 201 uses the type and number of congestion problems to assess the congestion severity. In particular embodiments, GPS region tracker 201 utilizes the round-trip "ping" time to assess congestion. This disclosure contemplates any suitable method of evaluating congestion severity of an overloaded wireless data network.

At Step 305, based on the assessed severity of the overloaded geographic region, GPS tracker 201 transmits an instruction to all clients in the affected geographic region to enter a reduced bandwidth mode and selectively throttle their own upstream traffic. In particular embodiments, GPS region tracker 201 transmits instructions for three levels of throttling. For example, if the detected congestion is low, GPS region tracker 201 may transmit a message to all affected clients to enter a reduced bandwidth mode only permitting the upload of low-resolution images. As another example, if the detected congestion is moderate, GPS region tracker 201 may issue a command to the affected mobile devices 122 to transmit only text-based content, such as check-ins, status messages, and comments. At the extreme end, if GPS region tracker 201 detects a high level of congestion, it may issue a command to the client devices in the region to cease all transmissions to the social networking system until further instructed. In particular embodiments, each of the reduced-bandwidth modes lasts a predetermined amount of time. In particular embodiments, each of the reduced bandwidth modes persists until an "all-clear" message is transmitted to the client devices, instructing them to revert to normal transmission.

While mobile devices are in the reduced bandwidth mode, their uploads to the social network may be further throttled by the social networking system. For example, in the "high" congestion mode, the social networking system may institute a round-robin upload queue, where each mobile device 122 is given a "clear to send" notification when it is the mobile device 122's turn to transmit content to the social networking system. In particular embodiments, the social networking applications running on mobile device 122 throttles traffic by selectively queuing uploads based on size. For example, information that is text only is queued before images. In particular embodiments, the client application applies a queuing algorithm that attempts to maximize the social relevance to size ratio. For example, check-ins offer a significant amount of information (where a user is, what he or she is doing, and possibly, if there are other users tagged, who the user is with) in a very small amount of data. Thus, check ins would be prioritized over status messages, comments, and photos. By the same rationale, check-ins with other users tagged would provide greater socially relevant information than a standard check in, and would be placed ahead in the queue. In particular embodiments, the queuing algorithm also applies to photos; a photo with multiple users tagged contains more socially relevant information than a photo with few or any tags. In another embodiment, photos with captions are given priority over photos lacking captions. In this manner, the client application residing on mobile device 122 briefly analyzes the content to be uploaded, and prioritizes the content with the highest social relevance to data size ratio for transmission to the social networking system.

At Step 306, GPS region tracker 201 updates a historical log of the congestion issue for the particular region. In particular embodiments, the historical log includes the date/time of the congestion, the number of users in the geographic region, the severity of the congestion, and the average round-trip "ping" time for users experiencing the congestion event. This historical database of overloaded wireless networks may be utilized to preemptively throttle traffic prior to actual congestion. In particular embodiments, the historical log may be analyzed against prior congestion events or external event databases, such as the home game schedule for the Golden State Warriors. This disclosure contemplates any suitable manner of generating and analyzing the historical congestion log.

In particular embodiments, the historical congestion log may be utilized to estimate the capacity of the wireless network serving the region. For example, the social networking system may determine, from the amount of congestion in the region and the number of users in the region, a rough estimate of the capacity of the wireless network. In particular embodiments, where GPS region tracker 201 is aware of which cellular tower the users are connected to, the number of server requests from users connected to a particular cell tower, together and the amount of congestion can yield a fairly accurate estimate of the wireless network capacity for the cell tower.

FIG. 4 illustrates a method of preemptively transmitting an instruction to enter a low-bandwidth mode to clients before network overloading occurs. The process of FIG. 4 can be run simultaneously with the process of FIG. 3; wherein the process of FIG. 3 detects new overloaded wireless networks and builds the historical log, while the process of FIG. 4 preemptively throttles client uploads in order to avoid causing congestion.

At Step 401, GPS region trackers 201 monitor their assigned region or regions. as previously stated, a region may comprise multiple cells for multiple carriers, a single cellular tower for a specific carrier, or a particular Wi-Fi network or coverage area. In particular embodiments, the social networking system may track both the location of its users, via GPS or other location information, as well as the wireless network from which the user is accessing the social networking system. In particular embodiments, GPS region tracker 201 uses a reverse IP address lookup to determine what carrier or WiFi access point the user device 122 is connected to.

GPS region tracker 201 monitors the number of users entering a particular region. At Step 402, it compares the number of users in a particular region to its estimate of the wireless network capacity for the particular region. In particular embodiments, if the number of users exceeds the estimated capacity of the region, GPS region tracker 201 transmits instructions to the clients in that particular region to begin throttling their own traffic. In particular embodiments, GPS region tracker 201 assumes every user in the region will not only connect to the wireless data network serving the region, but will upload a predetermined amount of data. In particular embodiments, the predetermined amount of data is a 1-megapixel photo. In particular embodiments, GPS region tracker 201 assumes only ½ of the users in the region will connect to the wireless data network and upload the predetermined amount of data. This disclosure contemplates any suitable method or algorithm for estimating the demand on the wireless data network for the number of user devices 122 in the region.

Regardless of the method of estimating demand and the method of estimating capacity, at Step 403, the social networking system transmits one or more instructions to the clients in the particular region to begin throttling their traffic. In particular embodiments, the preemptive low-bandwidth mode throttles traffic to the "low" congestion mode as described above. However, in particular embodiments, an estimated amount of congestion may be calculated from the difference between the estimated demand and estimated capacity.

Figure 5:
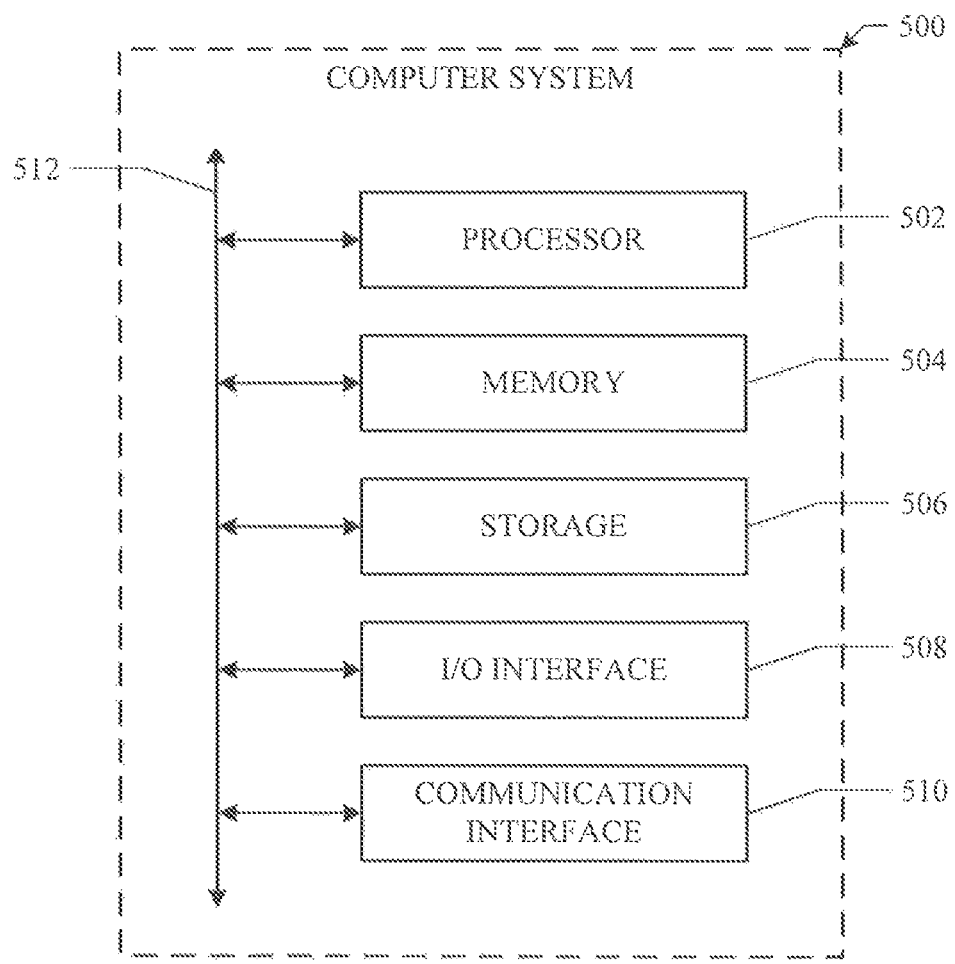
FIG. 5 illustrates an example computing system.

FIG. 5 illustrates an example computer system 500, which may be used with some embodiments of the present invention. This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. The present disclosure contemplates processor 502 including any suitable number of any suitable internal caches, where appropriate. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. In particular embodiments, one or more memory management units (MMUs) reside between processor 502 and memory 504 and facilitate accesses to memory 504 requested by processor 502. In particular embodiments, memory 504 includes random access memory (RAM). Memory 504 may include one or more memories 502, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. This disclosure contemplates mass storage 506 taking any suitable physical form. Storage 506 may include one or more storage control units facilitating communication between processor 502 and storage 506, where appropriate.

Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network (such as, for example, a 802.11a/b/g/n WI-FI network, a 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, a Long Term Evolution (LTE) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit (I2C) bus, a Serial Peripheral Interface (SPI) bus, a Secure Degital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, a Advanced Microcontroller Bus Architecture (AMBA) bus, or another suitable bus or a combination of two or more of these. Bus 512 may include one or more buses 512, where appropriate. Although this disclosure describes and illustrates a particular bus, this disclosure contemplates any suitable bus or interconnect.

Figure 6:
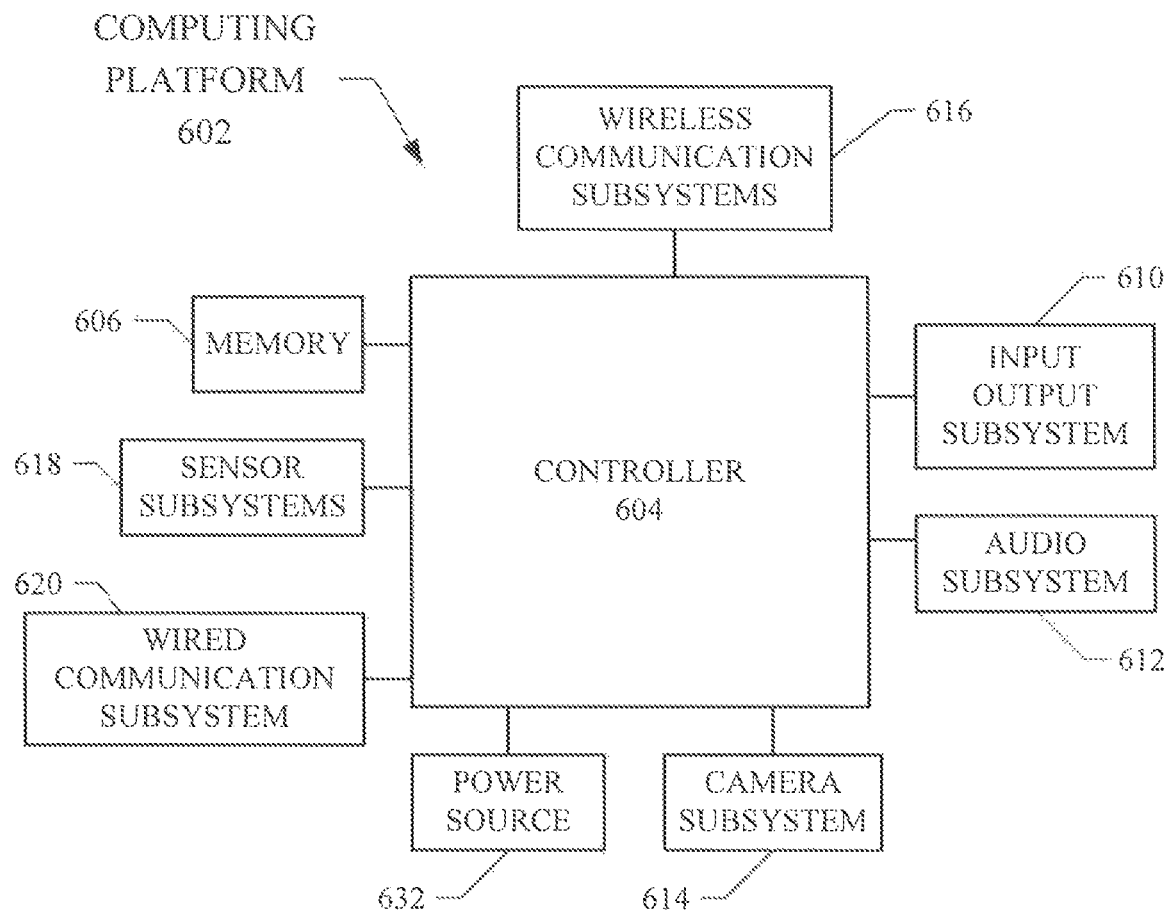
FIG. 6 illustrates an example mobile device platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 6 shows a schematic representation of the main components of an example computing platform of a client or mobile device, according to various particular embodiments. In particular embodiments, computing platform 602 may comprise controller 604, memory 606, and input output subsystem 610. In particular embodiments, controller 604 which may comprise one or more processors and/or one or more microcontrollers configured to execute instructions and to carry out operations associated with a computing platform. In various embodiments, controller 604 may be implemented as a single-chip, multiple chips and/or other electrical components including one or more integrated circuits and printed circuit boards. Controller 604 may optionally contain a cache memory unit for temporary local storage of instructions, data, or computer addresses. By way of example, using instructions retrieved from memory, controller 604 may control the reception and manipulation of input and output data between components of computing platform 602. By way of example, controller 604 may include one or more processors or one or more controllers dedicated for certain processing tasks of computing platform 602, for example, for 2D/3D graphics processing, image processing, or video processing.

Controller 604 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 606 that is operatively coupled to controller 604.

Memory 606 may encompass one or more storage media and generally provide a place to store computer code (e.g., software and/or firmware) and data that are used by computing platform 602. By way of example, memory 606 may include various tangible computer-readable storage media including Read-Only Memory (ROM) and/or Random-Access Memory (RAM). As is well known in the art, ROM acts to transfer data and instructions uni-directionally to controller 604, and RAM is used typically to transfer data and instructions in a bi-directional manner. Memory 606 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to controller 604. Information may also reside on one or more removable storage media loaded into or installed in computing platform 602 when needed. By way of example, any of a number of suitable memory cards (e.g., SD cards) may be loaded into computing platform 602 on a temporary or permanent basis.

Input output subsystem 610 may comprise one or more input and output devices operably connected to controller 604. For example, input output subsystem may include keyboard, mouse, one or more buttons, thumb wheel, and/or, display (e.g., liquid crystal display (LCD), light emitting diode (LED), Interferometric modulator display (IMOD), or any other suitable display technology). Generally, input devices are configured to transfer data, commands and responses from the outside world into computing platform 602. The display is generally configured to display a graphical user interface (GUI) that provides an easy to use visual interface between a user of the computing platform 602 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 610 may also include touch based devices such as touch pad and touch screen. A touchpad is an input device including a surface that detects touch-based inputs of users. Similarly, a touch screen is a display that detects the presence and location of user touch inputs. Input output system 610 may also include dual touch or multi-touch displays or touch pads that can identify the presence, location and movement of more than one touch inputs, such as two or three finger touches.

In particular embodiments, computing platform 602 may additionally comprise audio subsystem 612, camera subsystem 612, wireless communication subsystem 616, sensor subsystems 618, and/or wired communication subsystem 620, operably connected to controller 604 to facilitate various functions of computing platform 602. For example, Audio subsystem 612, including a speaker, a microphone, and a codec module configured to process audio signals, can be utilized to facilitate voice-enabled functions, such as voice recognition, voice replication, digital recording, and telephony functions. For example, camera subsystem 612, including an optical sensor (e.g., a charged coupled device (CCD), or a complementary metal-oxide semiconductor (CMOS) image sensor), can be utilized to facilitate camera functions, such as recording photographs and video clips. For example, wired communication subsystem 620 can include a Universal Serial Bus (USB) port for file transferring, or a Ethernet port for connection to a local area network (LAN).

Wireless communication subsystem 616 can be designed to operate over one or more wireless networks, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network). Additionally, wireless communication subsystem 616 may include hosting protocols such that computing platform 602 may be configured as a base station for other wireless devices.

Sensor subsystem 618 may include one or more sensor devices to provide additional input and facilitate multiple functionalities of computing platform 602. For example, sensor subsystems 618 may include GPS sensor for location positioning, altimeter for altitude positioning, motion sensor for determining orientation of a mobile device, light sensor for photographing function with camera subsystem 614, temperature sensor for measuring ambient temperature, and/or biometric sensor for security application (e.g., fingerprint reader).

In particular embodiments, various components of computing platform 602 may be operably connected together by one or more buses (including hardware and/or software). As an example and not by way of limitation, the one or more buses may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit (I2C) bus, a Serial Peripheral Interface (SPI) bus, a Secure Degital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, an Advanced Microcontroller Bus Architecture (AMBA) bus, or another suitable bus or a combination of two or more of these.

Additionally, computing platform 602 may be powered by power source 632.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a MultiMediaCard (MMC) card, an embedded MMC (eMMC) card, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, JavaScript, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising, by one or more computing systems:
   monitoring connections of a plurality of clients, the plurality of clients physically located in one or more geographic regions;
   determining that one or more of the clients have experienced connection problems in a particular one of the geographic regions; and
   maintaining a historical log of information related to the connections, the historical log comprising the connection problems;
   estimating, based on the historical log, capacity of a wireless network associated with the particular one of the geographic regions; and
   in response to a determination that a number of clients in the particular one of the geographic regions exceeds the estimated capacity of the wireless network, sending an instruction for the one or more clients to enter an upload queue which prioritizes uploading content with a greater ratio of social relevance to data size of the content from the plurality of clients, wherein the social relevance is calculated by a social networking system analyzing social graph information, the social graph information modeling the relationships between a plurality of users associated with the plurality of clients.

2. The method of claim 1, wherein the connection problems comprise: a failed content upload, a failed content download, a socket timeout, or a server timeout.

3. The method of claim 1, wherein the historical log further comprises: round trip ping time for each of the connections, an identification of a wireless data carrier associated with each of the connections, the number of users in the geographic region, date/time of a particular connection problem, or severity of a particular connection problem.

4. The method of claim 1, wherein the estimating capacity of a wireless network further comprises: correlating the historical log against an event database, an event schedule, or prior congestion events.

5. The method of claim 1, wherein the capacity of the wireless network is estimated for a given geographic region, wireless data carrier, cellular tower, or time.

6. The method of claim 1, further comprising: determining a geographic region based on GPS data transmitted from each of the clients or based on explicit location identifiers transmitted from each client.

7. The method of claim 6, wherein the explicit location identifiers comprise: a check-in, an RSVP to an event, or EXIF data appended to an uploaded image.

8. The method of claim 1, wherein the determining whether clients in the particular geographic region are experiencing connection problems further comprises: assessing severity of one of the connection problems based on one or more thresholds related to a moving average of the connection problems; wherein the instruction also includes a severity indicator.

9. The method of claim 8, wherein the moving average is based at least on the number of connection problems in a predetermined time duration for the geographic area.

10. The method of claim 8, wherein a low severity indicator is operable to instruct a client device receiving the instruction to upload only low resolution content.

11. The method of claim 8, wherein a medium severity indicator is operable to instruct a client device receiving the instruction to upload only text content.

12. The method of claim 8, wherein a high severity indicator is operable to instruct a client device receiving the instruction to halt all uploads until further instructed.

13. The method of claim 1, further comprising: calculating a connection capacity for the determined geographic area; and storing the connection capacity in a historical database.

14. One or more computer-readable non-transitory storage media embodying software comprising instructions operable when executed to:
   monitor connections of a plurality of clients, the plurality of clients physically located in one or more geographic regions;
   determine that one or more of the clients have experienced connection problems in a particular one of the geographic regions; and
   maintain a historical log of information related to the connections, the historical log comprising the connection problems;
   estimate, based on the historical log, capacity of a wireless network associated with the particular one of the geographic regions; and
   in response to a determination that a number of clients in the particular one of the geographic regions exceeds the estimated capacity of the wireless network, send an instruction for the one or more clients to enter an upload queue which prioritizes uploading content with a greater ratio of social relevance to data size of the content from the plurality of clients, wherein the social relevance is calculated by a social networking system analyzing social graph information, the social graph information modeling the relationships between a plurality of users associated with the plurality of clients.

15. The media of claim 14, wherein the connection problems comprise: a failed content upload, a failed content download, a socket timeout, or a server timeout.

16. The media of claim 14, wherein the historical log further comprises: round trip ping time for each of the connections, an identification of a wireless data carrier associated with each of the connections, the number of users in the geographic region, date/time of a particular connection problem, or severity of a particular connection problem.

17. The media of claim 14, wherein the instructions operable when executed to estimate capacity of a wireless network further comprises instructions operable when executed to: correlate the historical log against an event database, an event schedule, or prior congestion events.

18. A system comprising:
one or more processors; and a memory coupled to the processors comprising instructions executable by the processors, the processors being operable when executing the instructions to:
monitor connections of a plurality of clients, the plurality of clients physically located in one or more geographic regions; determine that one or more of the clients have experienced connection problems in a particular one of the geographic regions; and maintain a historical log of information related to the connections, the historical log comprising the connection problems;
estimate, based on the historical log, capacity of a wireless network associated with the particular one of the geographic regions; and
in response to a determination that a number of clients in the particular one of the geographic regions exceeds the estimated capacity of the wireless network, send an instruction for the one or more clients to enter an upload queue which prioritizes uploading content with a greater ratio of social relevance to data size of the content from the plurality of clients, wherein the social relevance is calculated by a social networking system analyzing social graph information, the social graph information modeling the relationships between a plurality of users associated with the plurality of clients.

19. The system of claim 18, wherein the processors are further operable when executing the instructions to: determine a geographic region based on GPS data transmitted from each of the clients or based on explicit location identifiers transmitted from each client, wherein the explicit location identifiers comprise: a check-in, an RSVP to an event, or EXIF data appended to an uploaded image.

20. The system of claim 18, wherein the processors operable when executing the instructions to determine whether clients in the particular geographic region are experiencing connection problems are further operable to: assess severity of one of the connection problems based on one or more thresholds related to a moving average of the connection problems; wherein the instruction also includes a severity indicator.

* * * * *